United States Patent [19]

McCullough et al.

[11] Patent Number: 5,510,413

[45] Date of Patent: Apr. 23, 1996

[54] POLYMER COMPOSITIONS

[75] Inventors: James D. McCullough; Thomas F. Brownscombe; Ananda M. Chatterjee, all of Houston, Tex.

[73] Assignee: Shell Polypropylene Company, Houston, Tex.

[21] Appl. No.: 811,218

[22] Filed: Dec. 20, 1991

[51] Int. Cl.[6] .................................................... C08K 3/34
[52] U.S. Cl. .......................... 524/450; 524/451; 524/452; 524/456
[58] Field of Search ...................... 524/450, 451, 524/452, 456

[56] References Cited

U.S. PATENT DOCUMENTS

| | | | |
|---|---|---|---|
| 2,882,243 | 4/1959 | Milton | 252/455 |
| 2,882,244 | 4/1959 | Milton | 252/455 |
| 2,995,358 | 1/1959 | Peyrebrune et al. | 271/3 |
| 3,030,181 | 4/1962 | Milton | 23/113 |
| 3,054,657 | 9/1962 | Breck | 23/113 |
| 3,130,007 | 4/1964 | Breck | 23/113 |
| 4,251,407 | 2/1981 | Schroeder et al. | 260/23 R |
| 4,330,649 | 5/1982 | Kioka et al. | 526/125 |
| 4,472,521 | 9/1984 | Band | 502/104 |
| 4,540,679 | 9/1985 | Arzoumanidis et al. | 502/111 |
| 4,710,428 | 12/1987 | Tamamizu et al. | 428/408 |
| 4,728,705 | 3/1988 | Nestlerode et al. | 526/125 |
| 5,053,372 | 10/1991 | Brownscombe | 502/60 |

*Primary Examiner*—Paul H. Michl
*Assistant Examiner*—John J. Guarriello
*Attorney, Agent, or Firm*—Arnold, White & Durkee

[57] ABSTRACT

Polymer compositions comprising α-olefin polymers and a minor proportion of synthetic basic zeolite are stabilized against the harmful effects of corrosion of metal surfaces when processed through mechanical equipment such as molds and extruders where the composition normally contacts metal surfaces.

22 Claims, No Drawings

POLYMER COMPOSITIONS

FIELD OF THE INVENTION

This invention relates to polymer compositions comprising certain polymeric materials and additional components which minimize the adverse effects of acidic materials normally formed during production of the polymer. More particularly, the invention relates to compositions comprising polyolefin polymer normally containing acidic residues of polymerization catalyst, which compositions incorporate a synthetic basic zeolite.

BACKGROUND OF THE INVENTION

The production of polymers and copolymers of ethylenically unsaturated monomers has gained substantial economic importance. The polymeric products are relatively inexpensive and exhibit a wide variety of commercially desirable properties depending in part upon the nature of the ethylenically unsaturated monomer(s). A number of such polymers are termed thermosetting while others are termed elastomeric and others are thermoplastic. One class of particularly useful polymers is the class of thermoplastic polyolefins resulting from the polymerization of lower $\alpha$-olefins such as propylene and ethylene.

In the case of the polymerization of ethylene, the process is relatively uncomplicated in that the product exists in only one steric form. For propylene and other $\alpha$-olefins several steric forms exist whose presence depends largely upon the type of catalyst employed. Much if not most of the polypropylene produced commercially is semi-crystalline and in the stereo form termed isotactic. Most recent propylene polymerization processes employ a highly active polymerization catalyst to produce polymer of acceptable properties without the need for extraction to remove amorphous or atactic polymer or deashing to remove catalyst residues. The catalyst residues that do remain in the polymer tend to be acidic and can and do cause problems when the polypropylene polymer is processed. The presence of acidic material may cause polymer degradation when the polymer is processed at elevated temperatures and may also corrode the metal surfaces of polymer processing equipment such as extruders or injection molding equipment. Such corrosion of metal surfaces introduces metallic species into the polymer and increases the likelihood of polymer decomposition or discoloration.

Although the above discussion is primarily in terms of polyolefin polymers, similar considerations apply to other polymeric materials with regard to acid contaminants. For example, the class of linear alternating polymers now known as polyketones is generally produced in the presence of a catalyst composition formed from, in part, acidic materials.

It is known that the adverse effects of acid impurities in polymeric material can be reduced by incorporation of an acid acceptor. For example, U.S. Pat. No. 4,251,407 discloses the use of zinc oxide as an acid acceptor in polypropylene. Other materials known to be useful for this purpose are metal stearates such as calcium stearate and the materials known as hydrotalcites. Although such materials can be helpful when incorporated within polymeric materials, it would be useful to provide additional acid acceptors to reduce the adverse effects of catalyst residues or other acidic impurities in polymeric materials, particularly polyolefins such as polypropylene.

SUMMARY OF THE INVENTION

The present invention provides polymer compositions stabilized against the adverse effects of acidic impurities within the polymer. More particularly, the invention provides polymer compositions of reduced corrosivity toward the metal surfaces of equipment in which such polymer compositions are likely to be in contact. The polymer compositions comprise a polymer normally containing acidic impurities including catalyst residues and a minor proportion of a synthetic basic zeolite.

DESCRIPTION OF THE INVENTION

The present invention is applied to polymers or polymeric compositions containing contaminants including catalyst residues which are acidic or which form acidic species. The polymer or composition is stabilized against the harmful effects of such acidic materials by the inclusion of certain synthetic basic zeolites. Without wishing to be bound by any particular theory, it appears likely that the basic zeolite serves as an acid acceptor to neutralize or effectively remove the acid components of the unstabilized polymer. As a result, the polymeric composition is less likely to discolor or degrade and the processing of the composition can be accomplished in mechanical equipment having metal surfaces, e.g., extruders or molds, with reduced corrosion of the metal surfaces.

Although the compositions of the invention may comprise a variety of polymers which typically contain acidic contaminants as a result of the method of their production, for example, the preferred compositions of the invention comprise polymers or copolymers of lower $\alpha$-olefins of up to 6 carbon atoms inclusive. Such polyolefins typically contain acidic residues or acidic residue precursors when produced in the presence of an olefin polymerization catalyst. The invention is particularly applicable to homopolymers or copolymers of at least one straight-chain $\alpha$-olefin of up to 4 carbon atoms inclusive, i.e., ethylene, propylene or 1-butene. Particularly preferred are compositions wherein the polymer is polypropylene homopolymer or ethylene/propylene copolymer. These polymers contain acidic catalyst residues resulting from use of a relatively low activity polymerization catalyst followed by incomplete removal of catalyst residues as by a deashing step, or by use of a high activity polymerization catalyst employed without a deashing step. The preferred compositions are those wherein the polymer is stereoregular polypropylene homopolymer or ethylene/propylene copolymer produced in the presence of a high activity olefin polymerization catalyst. These polymers typically contain small but potentially harmful proportions of acidic catalyst residues.

The polyolefin component of the preferred compositions is suitably produced in the presence of a wide variety of polymerization catalysts, but catalysts containing moieties of magnesium, titanium, aluminum and halogen are typical and products of processes using such catalysts are preferred. Illustrative of suitable catalysts and processes are those of Kioka et al, U.S. Pat. No. 4,330,649, Band, U.S. Pat. No. 4,472,521, Arizoumenides et al, U.S. Pat. No. 4,540,679, Job, U.S. Pat. No. 4,710,428 and Nestlerode et al, U.S. Pat. No. 4,728,705. These catalysts are produced from a magnesium species contacted at some time during production with a tetravalent titanium halide and also by an organoaluminum compound. Numerous other similar catalysts and processes are known in the art and generally result in the production of polyolefin product suitably treated according to the present invention.

The particular manner of polyolefin production is not material. The polymer is suitably produced by a gas-phase process utilizing one or more fluidized beds containing catalyst. Alternatively, the polymer is produced in a liquid-phase or slurry-phase process incorporating a reaction diluent which is an inert material such as heptane or is a liquefied monomer of the polymerization such as propylene. The polymerization is conducted in a continuous, semi-continuous or batchwise manner and the polymerization system may contain other materials such as molecular hydrogen as is known in the art.

The compositions of the invention comprise the polymers normally containing acidic contaminants and a stabilizing quantity of a synthetic basic zeolite. The zeolites are those crystalline aluminosilicates of the type conventionally referred to simply as zeolites. These materials usually contain some level of hydration which determines the proportion of Si-OH and Al-OH species present in the zeolite. The presence of the hydroxyl groups and the interaction of such groups with aluminum oxide centers is considered to convey acidic character to the zeolites. The hydroxyl groups contribute protonic acid character whereas the aluminum oxide centers are capable of accepting electrons and therefore function as Lewis acid sites. It is possible, and conventional, to neutralize some or all of the protonic acid sites of a zeolite with a base as by an ion exchange process, i.e., a cation exchange process. However, even with the complete neutralization of the protonic acid sites, the zeolites will retain some acidic character because of the acidic metal ions and aluminum oxide centers. The synthetic basic zeolites of the invention are those wherein basic character has been imparted to the zeolite by the provision of basic metal compounds in an amount in excess of that required to provide a fully cation-exchanged zeolite. In other words, more basic metal compound is provided than that amount necessary to completely ion exchange the protons of the protonic acid sites. The term "basic metal compound" refers to a compound of a divalent metal of Group II of the Periodic Table of Elements, i.e., beryllium, magnesium, calcium, strontium, barium, zinc, cadmium or mercury, which metal is chemically combined with one or more negative species in compound formation. Preferred are compounds of the Group II metals having an atomic number of from 12 to 30 inclusive and particularly preferred are compounds of calcium and zinc. The preferred metal compounds are those which are oxides or oxidic compounds or those which decompose under the conditions of synthetic basic zeolite production to form oxides or oxidic compounds. Such compounds are illustrated by oxides, hydroxides, nitrates, sulfates, carbonates, carboxylates, bicarbonates and oxyhalides. The synthetic basic zeolites of the compositions of the invention are typically produced by impregnation of the zeolite with the basic metal compound, and when necessary drying the impregnated zeolite and calcining the resulting product.

The synthetic basic zeolites of the compositions of the invention broadly include both naturally occurring and synthetic zeolites as precursors. Illustrative of naturally occurring zeolites are analcine, edingtonite, levynite, ecionite, faryasite, ferrierite, stilbite, lazurite, mordenite, natrolite and thomsonite. Naturally occurring zeolites are illustrated and described more fully in "Molecular Sieves-Principles of Synthesis and Identification," R. Szostak, Van Nostrand Reinhold, New York, 1989, incorporated herein by reference. Synthetic zeolites are often identified by a letter designation such as Zeolite X of U.S. Pat. No. 2,882,244, Zeolite Y of U.S. Pat. No. 3,130,007 and Zeolite A of U.S. Pat. No. 2,882,243. Other references to synthetic zeolites are formed in U.S. Pat. No. 3,030,181, U.S. Pat. No. 3,054,657 and U.S. Pat. No. 2,995,358 (Zeolite F). Numerous other U.S. and foreign patents and published patent applications relate to synthetic zeolites. These zeolites are disclosed and identified more fully in "Zeolite Molecular Sieves-Structure, Chemistry and Use," D. W. Breck, John Wiley & Sons, 1974, also incorporated herein by reference. Either class of zeolites may be utilized as the precursor of the synthetic basic zeolite in the so-called acidic form with at least predominately unneutralized protonic acid sites or in a form where the protonic acid sites have been predominately or completely exchanged with cations such as ammonium, sodium or potassium. In general, the class of synthetic zeolites is preferred because of cost and the greater uniformity of chemical composition and pore size.

The synthetic basic zeolites of the invention are produced by a variety of procedures. In one modification, a molten Group II metal compound is used to impregnate the zeolite. The compound is suitably melted and added to the zeolite by conventional procedures which will result in impregnation of the pores of the zeolite with the metal compound. Sufficient Group II metal compound should preferably be used to just fill the pores of the zeolite. As an alternative, the zeolite in finely divided form is coated with Group II metal compound, also in finely divided form. The coated zeolite is then heated to a temperature just sufficient to melt the Group II compound which then impregnates the zeolite. It is not generally necessary to dry an impregnated zeolite produced in this manner and the resulting synthetic basic zeolite is directly calcined. Calcination should be at a temperature above that at which the Group II metal impregnated the zeolite, typically from about 200° C. to about 600° C.

In a second modification, a sublimable Group II metal compound is heated to a temperature above its sublimation temperature and the resulting vapor is used to contact the zeolite material maintained at a temperature at or below the sublimation temperature of the Group II metal compound. The vapor will condense upon and within the pores of the zeolite and thereby impregnate the zeolite. Drying is then optionally employed to reduce or remove any residual moisture of the zeolite and the resulting material is calcined at a temperature above that of its formation.

In yet another but generally preferred modification, solutions of Group II metal compound are used to impregnate the zeolite. The precise nature of the solvent is not critical so long as the Group II metal compound is soluble in the solvent and the solvent is able to enter the pores of the zeolite. Water is a preferred solvent but other solvents, particularly polar solvents including ethers such as diethyl ether and alkanols such as methanol or ethanol, are satisfactory. When the zeolite has been impregnated with the Group II metal compound solution, evaporation of the solvent or addition of a second solvent containing one or more anions which causes a Group II metal compound to precipitate serves to coat the internal surfaces and pores with Group II metal compound. The impregnation is conducted in one or more impregnation steps using fresh Group II metal compound solution to provide Group II metal compound in excess of that required to fully cation exchange the zeolite. If desired, some other basic compound, e.g., an alkali metal compound can be used to neutralize a portion of the zeolite acidity, but the excess of base is provided by the Group II metal compound. Following the impregnation, the zeolite is dried if necessary to remove solvent and/or residual water of the zeolite and the resulting material is calcined at a temperature sufficient to prepare a basic material from the Group II metal compound, typically from about 100° C. to about 600° C.

The amount of Group II metal compound to be added to provide the requisite basicity is determinable by well known procedures, as is the amount of Group II metal compound that has been added and whether the zeolite is basic.

The nature of the synthetic basic zeolites of the invention and the processes for the production thereof are described in more detail in U.S. Pat. No. 5,053,372, incorporated herein by reference.

The synthetic zeolites of the invention are characterized by being at least partially crystalline with an ordered structure capable of detection by electrooptical or diffraction techniques such as X-ray diffraction, as opposed to amorphous aluminosilicates which are not within the scope of the invention. The synthetic basic zeolites, by virtue of having an excess of base over that required to fully cation exchange the zeolite, are basic in character and test basic to litmus and other indicators. The synthetic basic zeolites react as bases and catalyze base-catalyzed chemical reactions. The preferred synthetic basic zeolites of the invention will have a substantial proportion, e.g., up to about 95%, preferably greater than 50%, of the pore volume in micropores having diameters of from about 4 angstroms to about 12 angstroms, preferably from about 4 angstroms to about 8 angstroms. The Group II metal compound to be provided to the zeolite is at least about 1.05 and preferably at least 1.5 of the amount required to fully cation exchange the zeolite if present in the acid form. If the zeolite has been partially neutralized before Group II metal compound addition, the amount of Group II metal compound plus any earlier-added base will be sufficient to provide the required basic character.

The stabilized compositions of the invention are produced by forming a uniform mixture of the polymer and the synthetic basic zeolite. The zeolite proportion of the composition is a stabilizing quantity, i.e., a minor proportion of from about 100 ppm to about 3,000 ppm based on the total composition. Proportions of zeolite from about 200 ppm to about 1,000 ppm on the same basis are preferred. The zeolite is preferably provided in a finely divided state having a particle size from about 0.2 micrometer to about 20 micrometers. The compositions will not, of course, be homogeneous but good results are obtained if the compositions are substantially uniform. The compositions are produced by methods which are well known for producing a uniform mixture of a thermoplastic polymer and a heterogeneous solid. In one modification, the polymer and synthetic basic zeolite are mixed and passed through an extruder to produce the composition as an extrudate. In an alternate modification, the compositions are produced in a mixing device operated at high shear.

The compositions of the invention may also contain conventional additives designed to modify the processability and properties of the compositions, e.g., hindered phenolic antioxidants, processing stabilizers, UV stabilizers, fillers and reinforcements, colorants and flame retardant chemicals so long as the additives do not adversely affect the polymer or the synthetic basic zeolite. Such conventional additives are provided together with or separately from the components of the composition.

The compositions of the invention are processed by conventional methods of producing shaped articles from thermoplastic polymers, e.g., extrusion, injection molding and thermoforming. In contrast with the corresponding unstabilized polymers (no synthetic basic zeolite present), the compositions of the invention demonstrate a reduced corrosivity toward the internal metal surfaces with which the compositions of the invention are in contact during processing, particularly during processing at elevated temperature. This reduced corrosivity during processing in mechanical equipment such as extruders and molds provides economic savings from the standpoint of longer life for the mechanical equipment but also results in lower quantities of metallic residue in the polymer, which residues can lead to discoloration or degradation of the polymer.

The invention is further illustrated by the following Illustrative Embodiments which should not be regarded as limiting.

Illustrative Embodiment I

A zeolite termed LZY52 is marketed by Union Carbide Corporation as an extrudate. This zeolite is 66.5% wt silicon dioxide, 20.8% wt alumina, 10.4% wt sodium oxide with small proportions of ferric and calcium oxide. The zeolite has a unit cell size of 24.68 angstroms and a surface area of 825m$^2$/g. A 30.11 g portion of LZY52 was impregnated with 3.73 g of magnesium nitrate hexahydrate dissolved in 2 cc of highly purified, deionized water. The impregnation was conducted in a dish and the product was allowed to sit for 35 minutes before being dried in a 150° C. vacuum oven for 1 hour. An additional 6 cc of the deionized water was added and mixed with the solid. After sitting for 30 minutes the dish and contents were returned to the oven and dried overnight. The dried material was poured into a flask containing 150 cc of 0.5N potassium hydroxide solution. The resulting mixture was stirred for 1 hour and then filtered. The resulting solid powder was dried 3.25 hours in the 150° C. vacuum oven. The dried product is termed Zeolite A.

Illustrative Embodiment II

The procedure of Illustrative Embodiment I was repeated except that the zeolite used was 30.20 g of Valfor 4A (Sodium A-type zeolite) powder marketed by Kyowa. This zeolite has approximately 4 angstrom pores and a particle size of about 2 micrometers. The resulting powder is termed Zeolite B.

Illustrative Embodiment III

A 30.03 g sample of Valfor 4A zeolite was impregnated with 2.47 g of zinc nitrate hydrate dissolved in 24 cc of the purified, deionized water. The impregnation was conducted in a dish and the impregnated solid was allowed to stand 42 minutes before being dried in the 150° C. vacuum oven for 55 minutes. The resulting powder was poured into a Vycor tube and the tube was placed in an upright furnace. A nitrogen flow of 250 cc/minute was started through the dried powder and the furnace was slowly heated to 550° C. After 2 hours the furnace was cooled and the tube was removed. The tube was taken to a dry box where the contents were removed. This product is termed Zeolite C.

Illustrative Embodiment IV

A 30.04 g portion of washed LZY52 was impregnated with half of a solution of 5.91 g calcium nitrate hydrate dissolved in 4 cc of the purified, deionized water. The impregnation was conducted in a dish and the resulting material was allowed to sit 28 minutes before being dried in the 150° C. vacuum oven for 1 hour. The dried solid was placed in a flask with 150 cc of 0.5N potassium hydroxide solution. The resulting mixture was stirred for 1 hour and then filtered. The powder was then dried in the 150° C. vacuum oven for 1 hour. The dried material was then placed in a beaker and 70 cc of 0.1M stearic acid in diethyl ether was added to give a total column of 100 cc. Two 30 cc portion of the 0.1M stearic acid in ether solution were then added. After 25 minutes the mixture was filtered while the filter flask and the trap were packed in dry ice. The filtered solid was washed twice with 130 cc of diethyl ether and then vacuum dried. The resulting solid was then dried over a weekend in the 130° C. vacuum oven. The dried solid is termed Zeolite D.

Illustrative Embodiment V

Polypropylene formulations were prepared containing Ethanox 330, Irgafos 168 (conventional stabilizers) and an acid acceptor. In each case, unstabilized polypropylene powder of a nominal 2 melt flow (ASTM D-1238 condition L) and the additives were dry tumbled and extruded into pellets using a 1.25 inch Brabender extruder with a Maddock mixing screen, under nitrogen at 125 rpm and a melt temperature of 230° C. To test the efficiency of the acid acceptors evaluated, 30g of the formulated polypropylene pellets were melted in a glass cup and a mild steel disc (cooled by 18° C. water) was placed 1.3 cm over the polymer surface. The molten polymer was maintained at 260° C. for 30 minutes with the disc exposed to the vapors from the molten polypropylene. The disc was rinsed with acetone and examined visually for corrosion under a 30× microscope. The visual corrosivity scale varied from 1 (no visible corrosion) to 6 (very severe corrosion), with a rating of 3 being generally considered acceptable. Each of Zeolites A–D was tested and also evaluated were calcium stearate (CS) and a DHT-4A hydrotalcite which are conventional acid acceptors. Also evaluated was a sample of polypropylene without added acid acceptor whose corrosivity rating was 3.6. The other results of the evaluation are shown in the Table.

| CORROSIVITY RATING WITH ACID ACCEPTOR CONCENTRATION | | | |
| --- | --- | --- | --- |
| Acid Acceptor | 200 ppm | 500 ppm | 1000 ppm |
| CS | 4 | 4 | 1 |
| DHT-4A | 1 | 1 | 1 |
| Zeolite A | 4 | 5 | 2.8 |
| Zeolite B | 4 | 2.9 | 1.5 |
| Zeolite C | 4 | 3.6 | 1.5 |
| Zeolite D | 3.2 | 3.0 | 2.2 |

What is claimed is:

1. A stabilized composition comprising a thermoplastic polymer and a stabilizing quantity of a synthetic basic zeolite, wherein the sum of any earlier applied basic material and Group II metal compound is greater than that required to fully cation exchange the zeolite when in the acid form.

2. The composition of claim 1 wherein the polymer is a polymer or copolymer of at least one α-olefin of up to 4 carbon atoms inclusive.

3. The composition of claim 2 wherein the Group II metal compound is an oxide or oxide compound.

4. The composition of claim 3 wherein the zeolite is an at least partially crystalline aluminosilicate wherein the micropores have diameters from about 4 angstroms to about 12 angstroms.

5. The composition of claim 4 wherein the Group II metal is a Group II metal of atomic number from 12 to 30 inclusive.

6. The composition of claim 5 wherein the amount of any earlier applied basic material and magnesium, calcium or zinc compound is at least 1.5 times the amount required to fully cation exchange the zeolite when in the acid form.

7. The composition of claim 6 wherein the polymer is polypropylene or a copolymer of ethylene and propylene.

8. The composition of claim 7 wherein the Group II metal is calcium or zinc.

9. The composition of claim 8 wherein the Group II metal is calcium.

10. The composition of claim 8 wherein the Group II metal is zinc.

11. The composition of claim 10 wherein the polymer is propylene homopolymer.

12. A process for reducing the corrosivity of a thermoplastic polymer normally containing acidic impurities by incorporating therein a stabilizing quantity of a synthetic basic zeolite wherein the sum of any earlier applied basic material and Group II metal compound is greater than that required to fully cation exchange the zeolite when in the acid form.

13. The process of claim 12 wherein the polymer is a homopolymer or copolymer of at least one α-olefin of up to 4 carbon atoms inclusive.

14. The process of claim 13 wherein the Group II metal compound is an oxide or oxidic compound.

15. The process of claim 14 wherein the zeolite is an at least partially crystalline aluminosilicate wherein the micropores have diameters from about 4 angstroms to about 12 angstroms.

16. The process of claim 15 wherein the Group II metal has an atomic number from 12 to 30 inclusive.

17. The process of claim 15 wherein the sum of any earlier applied basic material and magnesium, calcium or zinc compound is at least 1.5 times the amount to fully cation exchange the zeolite in the acid form.

18. The process of claim 17 wherein the polymer is polypropylene or an ethylene/propylene copolymer.

19. The process of claim 18 wherein the Group II metal is calcium or zinc.

20. The process of claim 19 wherein the polymer is polypropylene.

21. The process of claim 20 wherein the Group II metal is calcium.

22. The process of claim 20 wherein the Group II metal is zinc.

* * * * *